(12) United States Patent
Fishman et al.

(10) Patent No.: US 7,205,516 B2
(45) Date of Patent: Apr. 17, 2007

(54) BONDING OF MATERIALS WITH INDUCTION HEATING

(75) Inventors: Oleg S. Fishman, Maple Glen, PA (US); Maochang Cao, Mount Laurel, NJ (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 10/615,150

(22) Filed: Jul. 8, 2003

(65) Prior Publication Data

US 2004/0007568 A1   Jan. 15, 2004

Related U.S. Application Data

(60) Provisional application No. 60/394,515, filed on Jul. 9, 2002.

(51) Int. Cl.
*H05B 6/10* (2006.01)
(52) U.S. Cl. .................. 219/633; 219/634; 156/380.2; 428/457
(58) Field of Classification Search .............. 219/633, 219/634, 612, 635, 645, 653, 655, 656, 659, 219/615; 156/380.2, 272.2, 272.4, 272.6, 156/500, 324; 428/457, 626; 29/609
See application file for complete search history.

(56) References Cited

U.S. PATENT DOCUMENTS

| | | | | |
|---|---|---|---|---|
| 2,367,715 A | * | 1/1945 | Chapman .................. 219/615 |
| 3,461,014 A | * | 8/1969 | James ...................... 156/272.4 |
| 3,556,887 A | * | 1/1971 | Adcock et al. ............. 428/457 |
| 3,860,778 A | * | 1/1975 | Rudd et al. .................... 219/67 |
| 3,941,643 A | * | 3/1976 | Balla ....................... 156/380.2 |
| 4,413,406 A | * | 11/1983 | Bennett et al. ................ 29/609 |
| 5,767,490 A | * | 6/1998 | Peter .......................... 219/603 |
| 6,770,380 B2 | * | 8/2004 | Steiner et al. .............. 428/626 |

* cited by examiner

Primary Examiner—Quang Van
(74) Attorney, Agent, or Firm—Philip O. Post (57) ABSTRACT

An apparatus and process are provided for bonding of materials by induction heating of an electrically conductive material upon which a second material is bonded. The electrically conductive material is induction heated between a first induction heating plate, and the combination of a frame and a second induction heating plate that is disposed within the frame. The second induction heating plate is removed from the surface of the electrically conductive sheet, while the frame continues to hold the electrically conductive sheet flat, and the second material, in liquid form, is poured into the interior opening of the frame in which the second induction heating plate was originally placed. The liquid material solidifies and bonds to the electrically conductive sheet to produce a bonded product. A continuous sheet of an electrically conductive material may be bonded to a continuous sheet of a second material by pressing them together and moving the pressed together materials through an induction coil to inductively heat the electrically conductive material and bond it with the second material.

10 Claims, 6 Drawing Sheets

BONDING OF MATERIALS WITH INDUCTION HEATING

CROSS REFERENCE TO RELATED APPLICATIONS

This application claims the benefit of U.S. Provisional Application No. 60/394,515, filed Jul. 9, 2002.

FIELD OF THE INVENTION

The present invention relates to the use of magnetic induction heating of a material to bond multiple materials together.

BACKGROUND OF THE INVENTION

Bonded materials are used in many applications. For example, a slide bearing may be formed from a bonded composition that consists of a metal backing plate and a bearing surface material that is bonded to the plate. The bearing surface material may be a metal composition such as a copper or an aluminum alloy. Slide bearings are linear or rotary in form. Linear slide bearings are in sheet form, whereas rotary slide bearings are in cylindrical or half-cylindrical form. Half-cylindrical slide bearings are used in pairs for applications such as journal bearings in internal combustion engines.

One method of producing slide bearings involves a continuous process line wherein the feedstock for the metal backing plate is a continuous roll of sheet steel. The continuous roll of sheet steel is fed through heat treating furnaces and further conditioned before the bearing surface material is applied to it. Raised edge lips are formed on the longitudinal edges of the continuous sheet and the bearing surface material, in a liquid form, such as a molten copper or aluminum alloy, is poured onto the sheet. The molten alloy solidifies and is bonded to the sheet, and can be quench treated. Subsequent milling controls the thickness of the bearing surface material. The sheet is cut into desired sizes for slide bearing applications. For rotary slide bearings, the cut pieces are further formed into a cylindrical shape. Economically, the process must operate as an uninterrupted line process, since stopping the line and restarting the line involves a substantial effort in repeatedly bringing the line's furnaces to operating temperature. Therefore there exists the need for a method of bonding metals in a batch process for applications such as slide bearings or in a continuous process without liquid or molten form of bearing material.

BRIEF SUMMARY OF THE INVENTION

In one aspect, the present invention is an apparatus for, and method of, producing a bonded product. An electrically conductive sheet is placed between a first induction heating plate, and the combination of a frame and a second induction heating plate disposed within the frame, and inductively heated. The second induction heating plate is moved away from the electrically conductive sheet. A liquid bonding composition, such as a molten metal, is poured into the open interior space of the frame over the top of the electrically conductive sheet wherein it solidifies and bonds to the electrically conductive sheet to produce a bonded product. Optionally the electrically conductive sheet may be placed in an indentation in the first induction heating plate which also serves to contain the liquid bonding composition.

In another aspect, the present invention is an apparatus for, and method of, continuously producing a bonded product by pressing together a continuous electrically conductive sheet and a continuous bonding material sheet, and advancing the pressed together sheets through an induction coil to heat the electrically conductive sheet and bond the bonding material sheet to the electrically conductive sheet. Alternatively two continuous bonding material sheets are disposed between two electrically conductive sheets, pressed together and advanced through an induction coil to heat the two electrically conductive sheets and bond each of the bonding material sheets to its adjacent electrically conductive sheet.

These and other aspects of the invention are set forth in this specification and the appended claims.

BRIEF DESCRIPTION OF THE DRAWINGS

The figures, in conjunction with the specification and claims, illustrate one or more non-limiting modes of practicing the invention. The invention is not limited to the illustrated layout and content of the figures in the drawings.

FIGS. 8(*a*), 8(*b*) and 8(*c*) illustrate another example of the present invention for bonding materials with induction heating.

DETAILED DESCRIPTION OF THE INVENTION

Referring now to the drawings, wherein like numerals indicate like elements, there is shown in FIG. 1 through FIG. 5, one example of apparatus 10 of the present invention for bonding of materials with induction heating. Apparatus 10 includes first induction heating plate 12, frame 14 and second induction heating plate 16. First and second induction heating plates 12 and 16, and frame 14, are formed from a heat resistant, non-electrically conductive material, such as a ceramic composition. First plate induction coil 18 is disposed in first induction heating plate 12; frame induction coil 20 is disposed in frame 14; and second plate induction coil 22 is disposed in second induction heating plate 16. When a castable material, such as a ceramic composition, is used for the heating plates and frames, the coils may be embedded in the heating plates and frame during the casting process.

The induction coils are arranged to form a transverse induction coil assembly for inductively heating an electrically conductive sheet 90 placed between the first induction heating plate, and the combination of the frame and second induction heating plate when the second induction heating plate is inserted into the frame. While the sheet is generally referred to as a metal sheet, any electrically conductive material may be used. The particular arrangement of coils shown in the figures illustrates one non-limiting example of transverse flux coil arrangements that can be used in the present invention. The illustrated induction coils may be fluid (liquid or gas) cooled by circulation of a cooling fluid, such as water, through hollow induction coils or separate cooling coils in the heating plates and frame. In some examples of the invention, an induction coil may not be necessary in frame 14.

Figure 1:
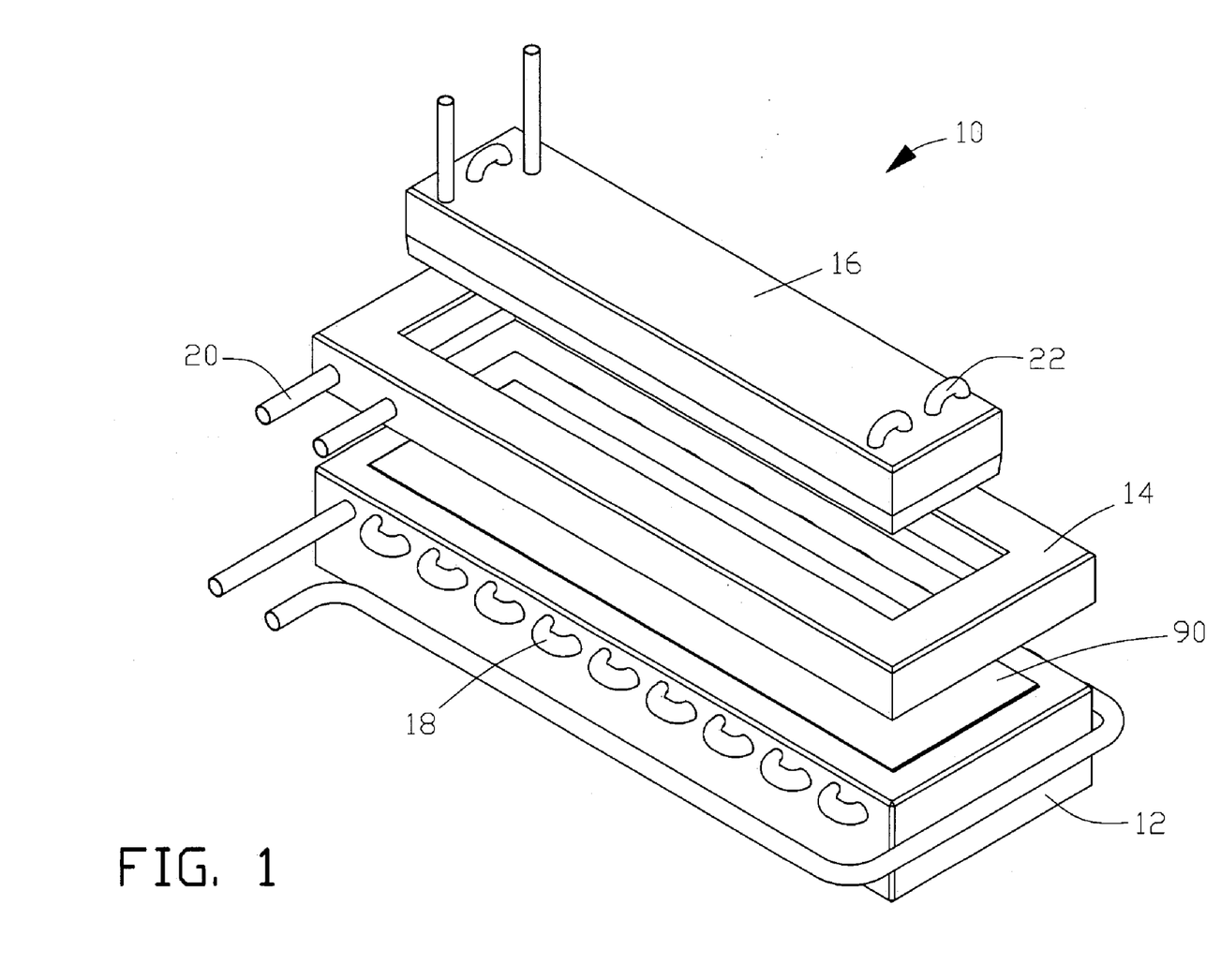
FIG. 1 is an isometric view of one example of an apparatus of the present invention for bonding materials with induction heating.
Figure 2:
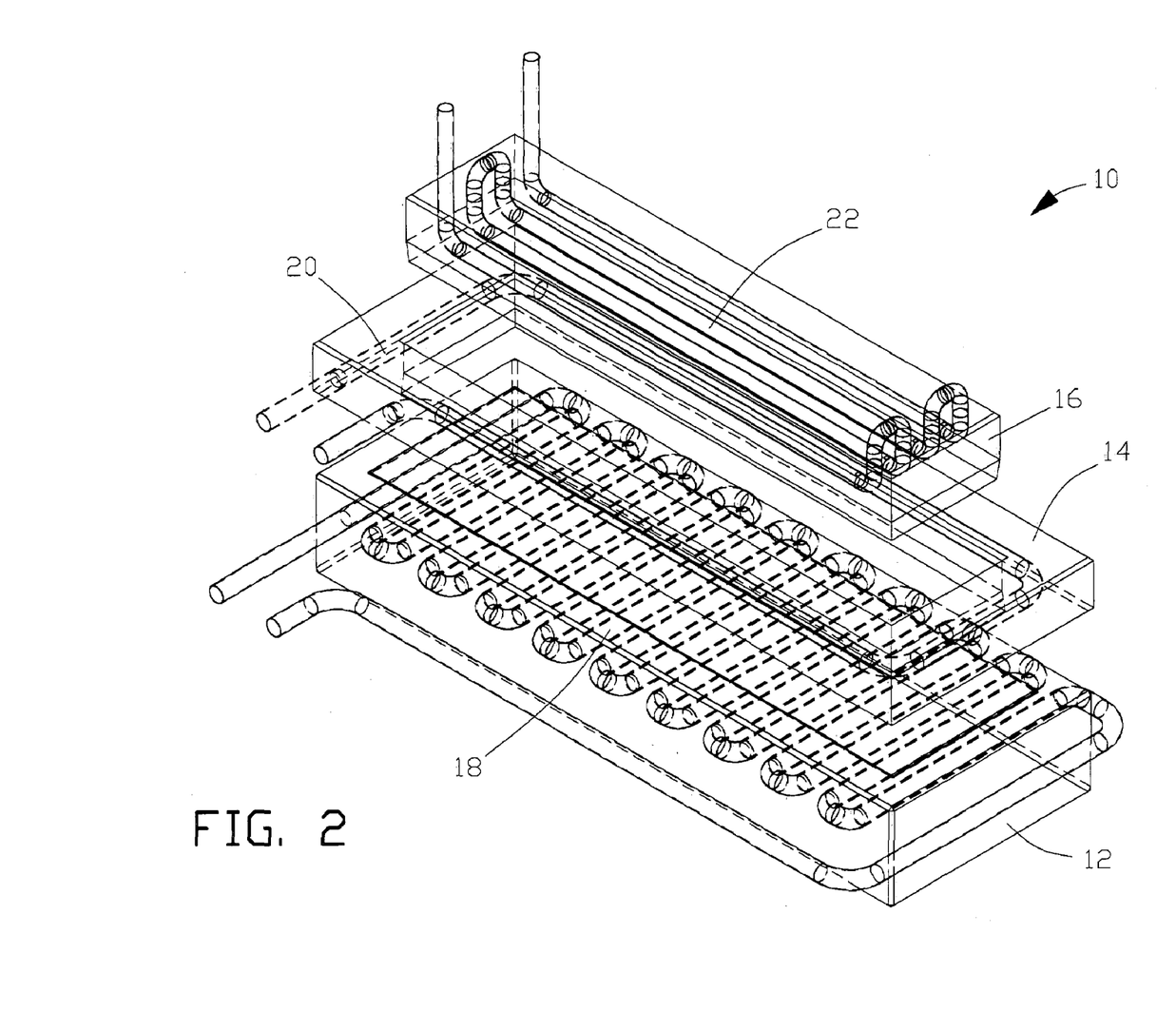
FIG. 2 is an isometric view illustrating one example of an arrangement of induction coils for the apparatus shown in FIG. 1.
Figure 3:
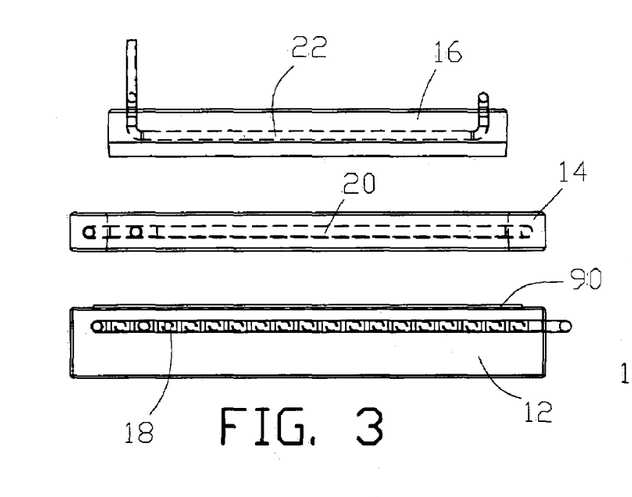
FIG. 3 is a front elevational view of the apparatus shown in FIG. 1.
Figure 4:
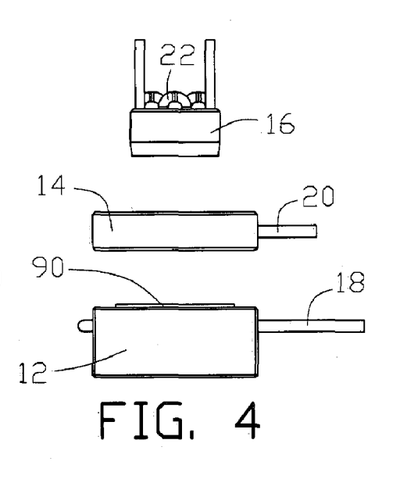
FIG. 4 is a side elevational view of the apparatus shown in FIG. 1.

Metal sheet 90 is placed upon the top surface of first induction heating plate 12. The dimensions of metal sheet 90 are such that when frame 14 is placed over the top surface of first induction heating plate 12, the perimeter of the metal sheet will extend beyond the interior open space in frame 14 to establish a metal sheet contact surface around the metal sheet's perimeter that is sandwiched between the top surface of the first induction heating plate 12 and the bottom surface of frame 14.

Figure 5:
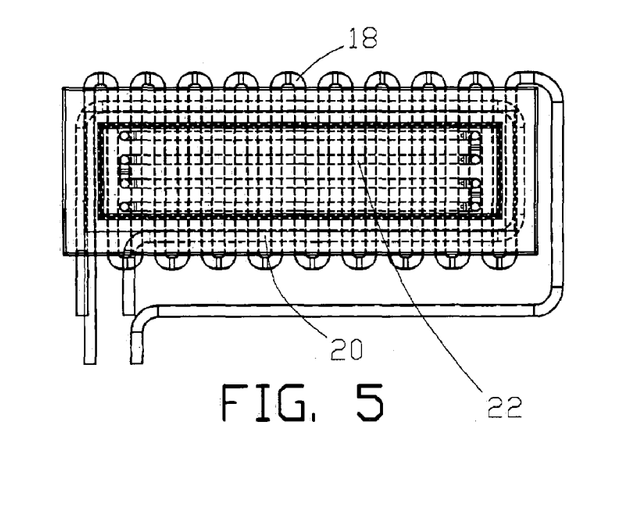
FIG. 5 is a top view of the apparatus shown in FIG. 1, further illustrating the arrangement of induction coils shown in FIG. 2.

With metal sheet 90 positioned on the surface of first induction heating plate 12, as described above, frame 14 and second induction heating plate 16 are placed over the top surface of the first induction heating plate 12 and the metal sheet. The interior open space in frame 14 is sized to allow the fitting of second induction heating plate 16 so that the bottom surface of the second induction heating plate 16 makes contact with metal sheet 90. With the frame and second induction heating plate placed over metal sheet 90, suitable ac current is supplied from one or more power sources to first plate induction coil 18, frame induction coil 20, and second plate induction coil 22. The magnetic field created by ac current flow in the first plate induction coil 18 inductively penetrates and heats into the facing side of metal sheet 90, whereas the magnetic fields created by ac current flow in the frame induction coil and second plate induction coil inductively penetrate and heat into the opposing side of the metal sheet. As best illustrated in FIG. 5, the orthogonal orientation of the first plate induction coil to the combination of the frame and second plate induction coils provides a crisscross induction heating pattern that enhances uniform heat penetration of the sheet. Pressing the metal sheet between the first and second induction heating plates prevents surface distortion of the sheet as it is heated.

When metal sheet 90 has been inductively heated to a desired temperature, second induction heating plate 16 is raised at least a sufficient distance to allow pouring of a molten metal composition, such as a copper or aluminum alloy, onto the top surface of the heated metal sheet. The temperature of the metal sheet may be sensed by one or more sensors, such as contact thermocouples embedded in the first and/or second induction heating plates to determine when the sheet has been heated to the desired temperature. For example, if the metal sheet is steel, it is heated to approximately 2,100° F. for casting of a molten alloy, such as bronze, onto its surface. While the term "molten metal" or "molten alloy" is used, any liquid material capable of bonding with the heated electrically conductive sheet may be used. Frame 14 remains in place to hold the metal sheet flat and to provide a dam for the molten metal composition. The molten metal may be ported through one or more openings in frame 14, or poured, into the interior open space in frame 14 which was previously occupied by the second induction heating plate. After pouring a quantity of molten metal over the top surface of the metal sheet, the metal will bond with the sheet as it cools. Alternatively, the metal can be quenched by injecting a quench fluid or gas into the interior open space in the frame over the top surface of the cooled molten metal. The quench material may be ported through one or more openings in frame 14, or poured, into the interior open space in frame 14. The now solidified molten metal is bonded to the metal sheet to form a bonded metal product, and frame 14 can be removed from over the top surface of first induction heating plate 12. The interior surface wall of frame 14 may be skewed towards its outer wall in the region where the molten metal is poured to facilitate removal of the frame. Additionally the same region of the wall may be specially treated with a coating that will inhibit bonding of the molten metal to the wall of the frame. By way of example, and not limitation, a typical range of thickness of the metal sheet is approximately 3.5 to 19 mm, and a typical range of thickness of the cast metal on the metal sheet is approximately 2.5 to 5.0 mm. Further working of the product can include milling for thickness control of the product. If the product is used as slide bearings, the product is appropriately cut to the desired dimensions. For rotary slide bearings, the cut product is then worked to a cylindrical shaped.

In an alternative embodiment of the invention, the top surface of first induction heating plate 12, rather than being flat, is indented for an area approximately equal to the surface area of the bottom surface of second induction heating plate 16. In this arrangement, after metal sheet 90 has been heated, the second induction heating plate can be moved towards the metal sheet to apply sufficient pressure on the heated sheet to force it into the indentation in the first induction heating plate. In this example, the frame does not generally provide a dam for the molten metal composition that is poured over the top of the sheet since the raised edges of the indented metal sheet and/or the walls of the indentation will serve as a dam for the molten metal composition. In this example of the invention, the frame serves as a means for holding the metal sheet in place during induction heating and molten metal pour after the sheet is pressed into the indentation in the first induction heating plate.

Figure 8A:
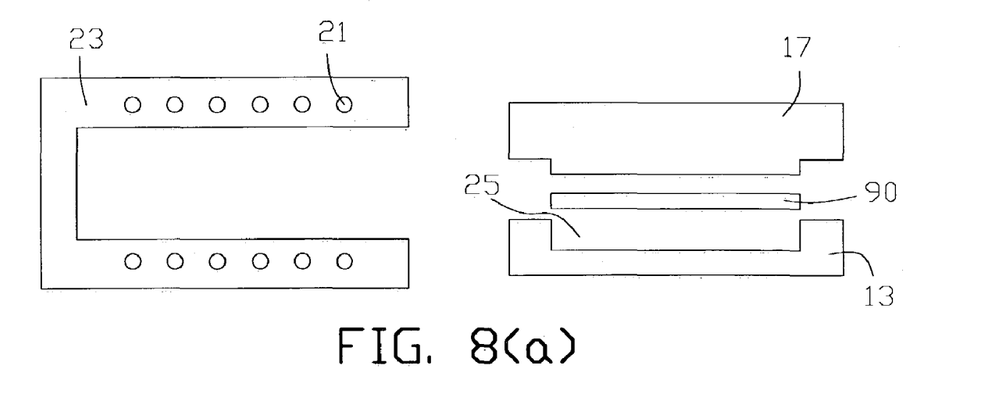
Figure 8B:
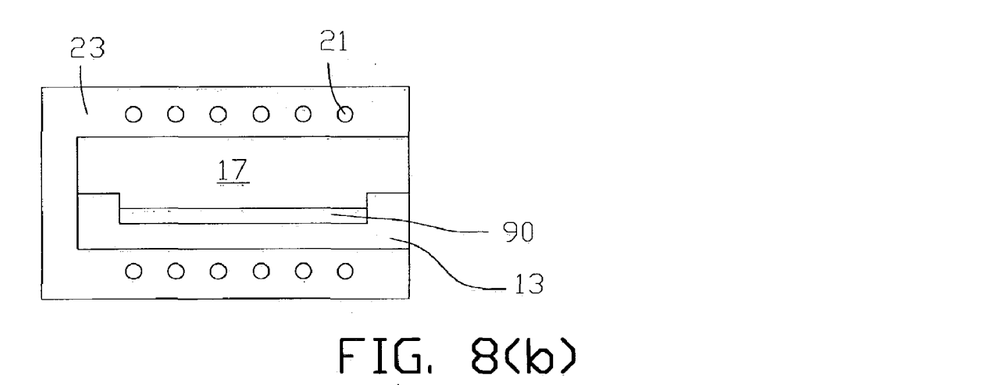
Figure 8C:
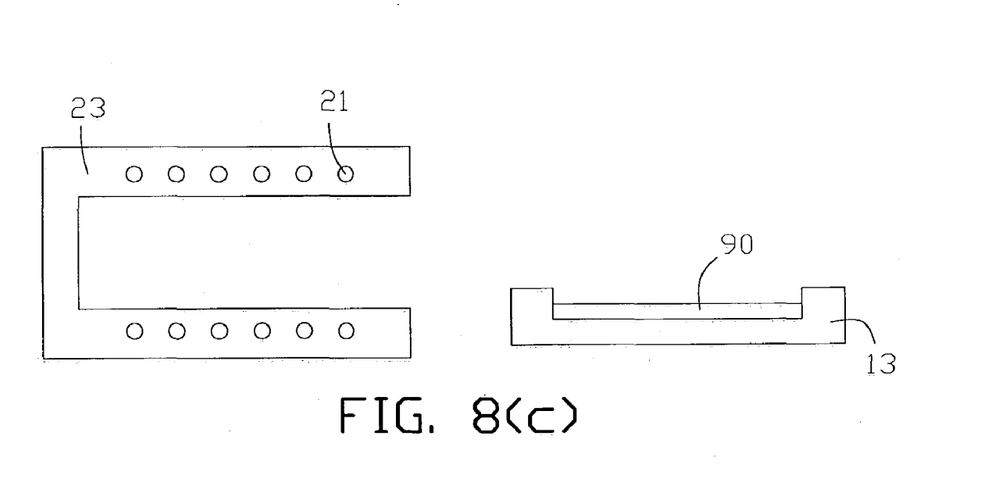

In other examples of the invention longitudinal flux coils, such as solenoidal coils, may be utilized. For example, as illustrated in FIG. 8(*a*), solenoidal induction coil 21 is disposed in inductor assembly 23. Metal sheet 90 is inserted into indentation 25 in first heat resistant plate 13. Second heat resistant plate 17 is placed over the first ceramic plate and the enclosed metal sheet is inserted into inductor assembly 23 as shown in FIG. 8(*b*) wherein it is inductively heated by a magnetic field established when as current flows through coil 21. After the metal sheet reaches the desired temperature, the enclosed metal sheet is removed from the inductor assembly, and the second heat resistant plate is removed, as shown in FIG. 8(*c*), so that the molten metal can be poured over the metal sheet in the indentation.

Figure 6:
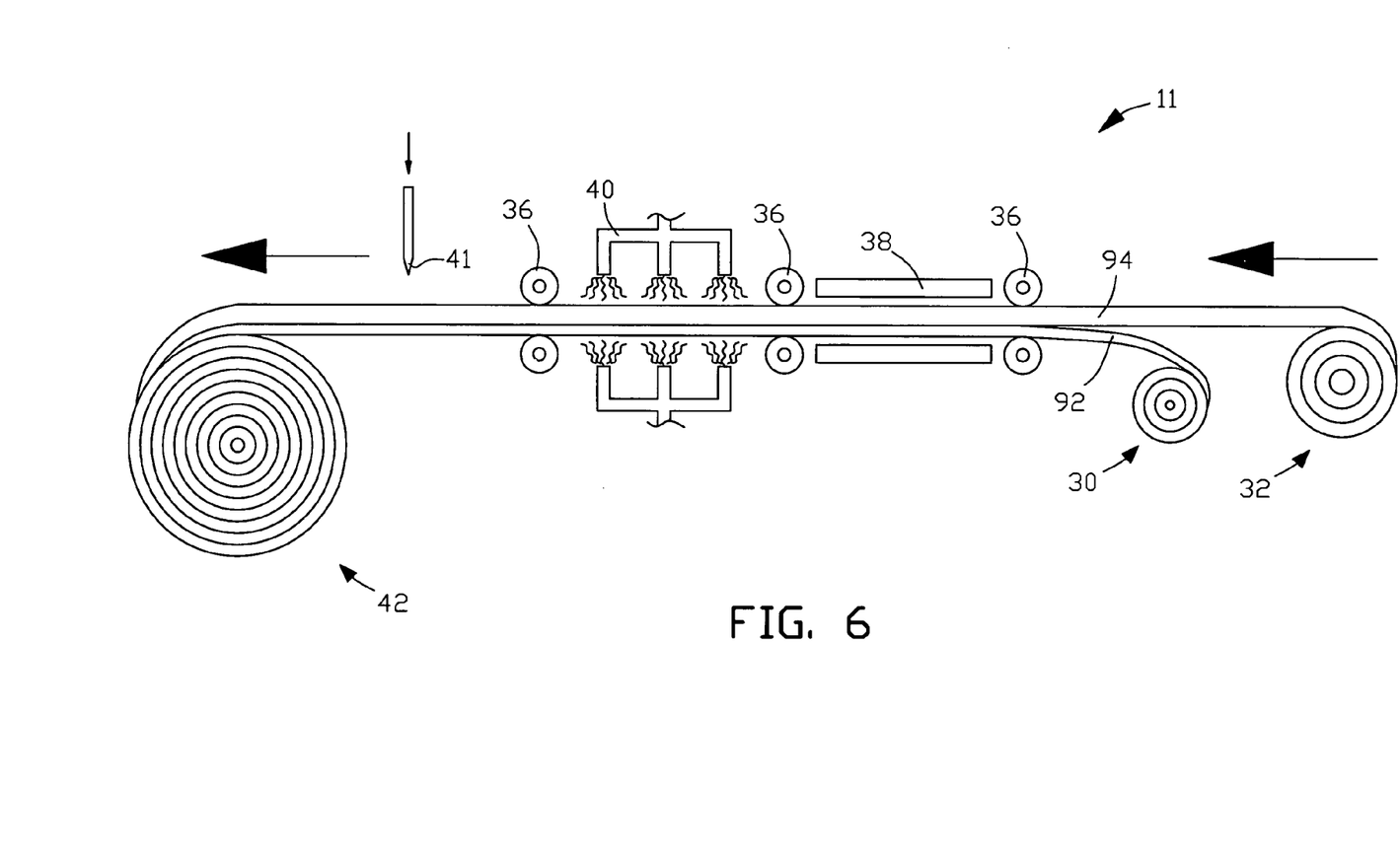
FIG. 6 is a side elevational view of another example of an apparatus of the present invention for bonding materials with induction heating.

In another example of apparatus 11 of the present invention for bonding of materials with induction heating, as illustrated in FIG. 6, a continuous supply of base metal sheet 92 is provided from base metal sheet supply roll 30 and a continuous supply of bond material sheet 94 is provided from bond material sheet supply roll 32. Steel is a suitable, but non-limiting, composition of the base metal sheet, and bronze is a suitable, but non-limiting, composition of the bond material sheet. Suitable joining and conveying means, such as rollers 36 press metal sheet 92 and bond material sheet 94 together and advance it through one or more induction coils 38 wherein the magnetic field established by an ac current flow through the coils inductively heats and bonds the bond material sheet to the base metal sheet. The one or more induction coils may be of any suitable configuration, including transverse flux or longitudinal flux coils, or a combination thereof. Since the induced current flows in the bond material sheet and returns through the base metal sheet, the required frequency of the ac current in the one or more induction coils is lower than that required for the previous examples of the invention. Optionally the bonded sheets may be quenched with a suitable quench medium supplied through quench apparatus 40 after the bonded sheets exit from the one or more induction coils. The bonded sheets can be accumulated, for example, on bonded sheets product roll 42 for bulk shipment to finishing facilities that produce, for example, slide bearings from the product roll.

Figure 7:
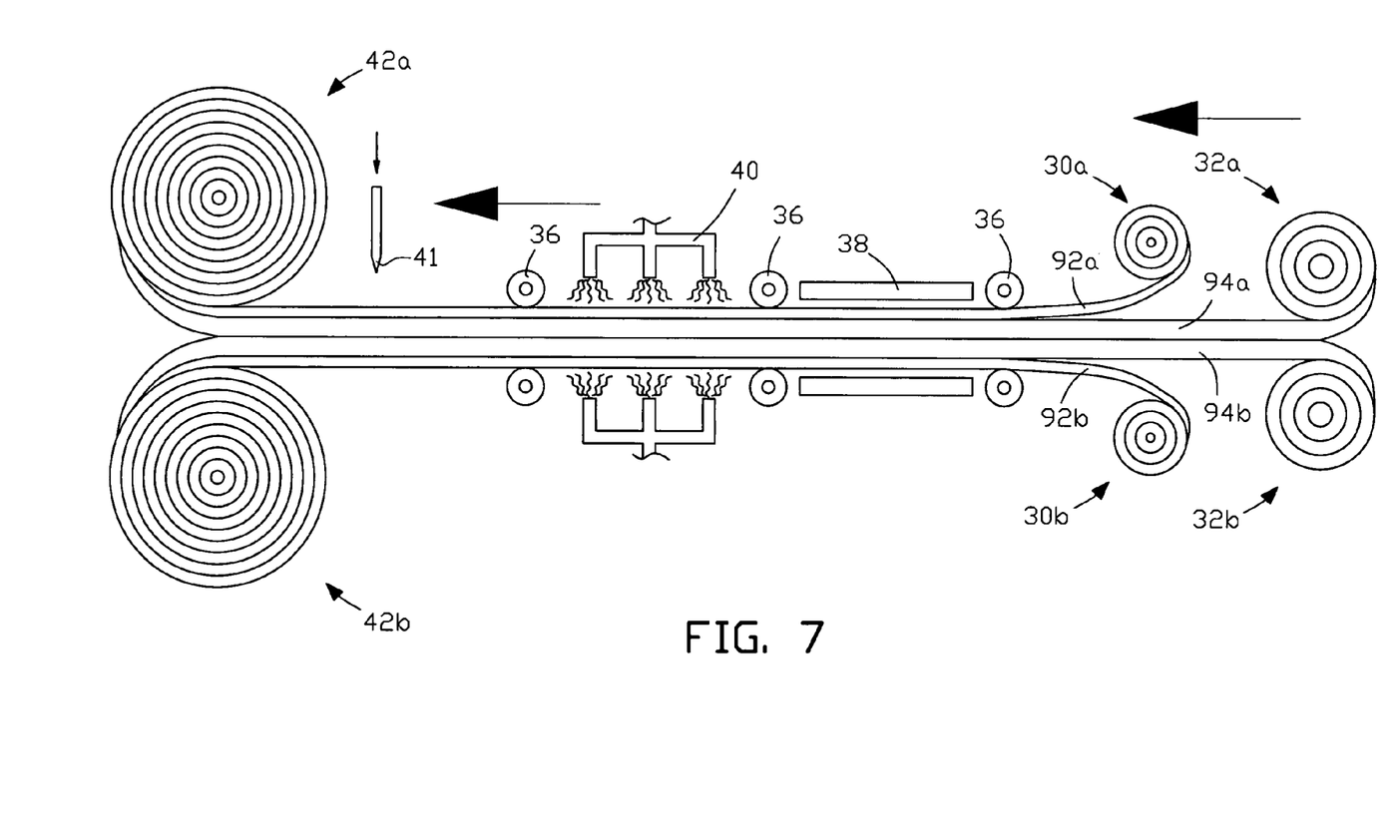
FIG. 7 is a side elevational view of another example of an apparatus of the present invention for bonding materials with induction heating.

FIG. 7 illustrates an alternative to the arrangement in FIG. 6. In the example of the invention shown in FIG. 7, two bond material sheets 94*a* and 94*b* are provided from bond material sheet supply rolls 32*a* and 32*b*, respectively, and are disposed between two base metal sheets 92*a* and 92*b*, which are provided from base metal sheet supply rolls 30*a* and 30*b*. Suitable joining and conveying means, such as rollers 36 press metal sheets 92*a* and 92*b* together with the two bond material sheets 94*a* and 94*b* between them, and advance the pressed sheets through one or more induction coils 38 wherein the magnetic field established by an ac current flow through the coils inductively heats and bonds each of the two bond material sheets to the base metal sheet making contact with it. Generally the melt temperature of the bond material sheet is lower than the melt temperature of the base metal sheet. In some arrangements the required heated temperature of the base metal sheet may be sufficient to overheat the bond material sheet. The arrangement shown in FIG. 7 minimizes heating of the bond material sheets since induced currents flow only through the two opposing base metal sheets. Consequently the required frequency of the ac current in the one or more induction coils is lower than that required for the previous example of the invention in FIG. 6. After optional quenching, bonded sheets comprising base metal sheet 92*a* and bond material sheet 94*a* is accumulated on bonded sheets product roll 42*a* and bonded sheets comprising base metal sheet 92*b* and bond material sheet 94*b* is accumulated on bonded sheets product roll 42*b*. Optionally a sheet of heat resistant material can be inserted between adjacent facing sides of bond material sheets 94*a* and 94*b* prior to induction heating to keep the two bond metal sheets from sticking together. The sheet of heat resistant material is removed subsequent to the step of induction heating.

Optionally the bonded sheets may be cut into one or more bonded products by applying suitable cutting means, such as cutting shear 41, which is schematically shown in FIG. 6 and FIG. 7, to the bonded sheets.

The foregoing examples do not limit the scope of the disclosed invention. The scope of the disclosed invention is further set forth in the appended claims.

The invention claimed is:

1. An induction bonding apparatus for bonding a first bond sheet substantially comprising a first bonding material to a first base sheet of a first base material and for bonding a second bond sheet substantially comprising a second bonding material to a second base sheet of a second base material, the apparatus comprising:

a means for bringing the first base sheet adjacent to the first bond sheet to form a first adjacently disposed base-bond sheet;

a means for bringing the second base sheet adjacent to the second bond sheet to form a second adjacently disposed base-bond sheet;

a means for bringing the first bond sheet of the first adjacently disposed base-bond sheet adjacent to the second bond sheet of the second adjacently disposed base-bond sheet to form a back-to-back layered sheeting arrangement; and one or more induction coils through which the back-to-back layered sheeting arrangement passes to inductively heat at least the first and second base sheets to bond the first bond sheet to the first base sheet and form a first bonded sheet, and to bond the second bond sheet to the second base sheet to form a second bonded sheet.

2. The induction bonding apparatus of claim 1 further comprising a means for cutting one or more bonded products from the first and second bonded sheets.

3. The induction bonding apparatus of claim 1 wherein the first and second base sheets each comprise a substantially electrically conductive composition and the first and second bond sheets each comprise a substantially non-electrically conductive composition whereby the first and second base sheets are inductively heated and the adjacent first and second bond sheets are melted by the inductively heated first and second base sheets to form the first and second bonded sheets.

4. The induction bonding apparatus of claim 3 wherein a sheet of heat resistant material is inserted between the adjacently disposed first and second bond sheets.

5. A method of bonding a first bond sheet substantially comprising a first bonding material to a first base sheet comprising a first base material and a second bond sheet substantially comprising a second bonding material to a second base sheet comprising a second base material, the method comprising the steps of:

placing the first bond sheet adjacent to the first base sheet to form a first adjacently disposed base-bond sheet;

placing the second bond sheet adjacent to the second base sheet to a second adjacently disposed base-bond sheet;

placing the first bond sheet of the first adjacently disposed base-bond sheet adjacent to the second bond sheet of the second adjacently disposed base-bond sheet to form a back-to-back layered sheeting arrangement; and inductively heating the back-to-back layered sheeting arrangement by passing the back-to-back layered sheeting arrangement through one or more induction coils to form a first bonded sheet comprising the first bond sheet bonded to the first base sheet and a second bonded sheet comprising the second bond sheet bonded to the second base sheet.

6. The method of claim 5 further comprising the step of inserting a sheet of heat resistant material between the adjacently disposed first and second bond sheets prior to the step of inductively heating.

7. The method of claim 5 further comprising the step of forming the first and second bonding materials from substantially non-electrically conductive materials and forming the first and second base materials from substantially non-electrically conductive materials whereby the first and second base sheets are inductively heated and the adjacent first and second bond sheets are melted by the inductively heated first and second base sheets to form the first and second bonded sheets.

8. The method of claim 7 further comprising the step of inserting a sheet of heat resistant material between the adjacently disposed first and second bond sheets prior to the step of inductively heating.

9. A method of forming one or more bonded products, the method comprising the steps of:

placing a first bond sheet comprising a substantially non-electrically conductive composition adjacent to a first base sheet comprising a substantially electrically conductive composition to form a first adjacently disposed base-bond sheet;

placing a second bond sheet comprising a substantially non-electrically conductive composition adjacent to a second base sheet comprising a substantially electrically conductive composition to form a second adjacently disposed base-bond sheet;

placing the first bond sheet of the first adjacently disposed base-bond sheet adjacent to the second bond sheet of the second adjacently disposed base-bond sheet to form a back-to-back layered sheeting arrangement;

inductively heating the first and second base sheets by passing the back-to-back layered sheeting arrangement through one or more induction coils;

melting the first and second bond material sheets from the heat of the inductively heated first and second base material sheets to form a first bonded sheet comprising the first bond sheet bonded to the first base sheet and a second bonded sheet comprising the second bond sheet bonded to the second base sheet; and cutting the one or more bonded products from the first and second bonded sheets.

10. The method of claim 9 wherein a sheet of heat resistant material is inserted between the adjacently disposed first and second bond sheets.

* * * * *